(12) United States Patent
Hiramoto et al.

(10) Patent No.: US 6,585,564 B1
(45) Date of Patent: *Jul. 1, 2003

(54) MACHINE TOOL DEVICE AND ITS WORKING FLUID FEED DEVICE

(75) Inventors: Kazuyuki Hiramoto, Yamanashi (JP); Keigo Tada, Yamanashi (JP)

(73) Assignee: Makino Milling Co., LTD, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/889,046

(22) PCT Filed: Nov. 15, 1999

(86) PCT No.: PCT/JP99/06369

§ 371 (c)(1),
(2), (4) Date: Jul. 10, 2001

(87) PCT Pub. No.: WO01/36150

PCT Pub. Date: May 25, 2001

(51) Int. Cl.[7] ................................................. B24B 19/00
(52) U.S. Cl. ............................... 451/7; 451/10; 451/11; 451/450
(58) Field of Search ............................... 451/7, 5, 9, 10, 451/11, 449, 450

(56) References Cited

U.S. PATENT DOCUMENTS

| | | |
|---|---|---|
| 4,619,078 A | 10/1986 | Uhlig |
| 4,956,944 A | 9/1990 | Ando et al. |
| 5,827,112 A | 10/1998 | Ball |
| 5,916,013 A | 6/1999 | Naumann et al. |
| 6,224,462 B1 * | 5/2001 | Yokoyama et al. ........... 451/10 |
| 6,244,928 B1 * | 6/2001 | Hiramoto et al. .............. 451/5 |

FOREIGN PATENT DOCUMENTS

| | | |
|---|---|---|
| JP | 62-134642 | 8/1976 |
| JP | 61-124366 | 8/1986 |
| JP | 1-146662 | 6/1989 |
| JP | 5-31669 | 2/1993 |
| JP | 6-31582 | 2/1994 |
| JP | 7-156050 | 6/1995 |
| JP | 7-204978 | 8/1995 |

* cited by examiner

*Primary Examiner*—Eileen P. Morgan
(74) *Attorney, Agent, or Firm*—Paul & Paul

(57) ABSTRACT

The present invention relates to a machine tool system and a machining liquid supply device for machining a workpiece by a tool such as a grinding wheel or a milling cutter, and solves the problem of how to supply the machining liquid optimally to an area where the tool engages with the workpiece. In order to solve this problem, the present invention is so configured that during the machining of a workpiece with a tool (T) detachably mounted on a spindle (12) of a machine tool (MT), the machining liquid supply device (18) for supplying a machining liquid to a machining area of the tool (T) is provided with an opening end at the forward end of a machining liquid supply nozzle (20), and can give the movements in a radial direction and a circumferential direction through 360° with respect to the axis of the spindle (12) about the spindle head (12) having the spindle (12) through a rotational supporting body (16) by means of linear movement means (80) and rotating movement means (30), respectively.

12 Claims, 7 Drawing Sheets

MACHINE TOOL DEVICE AND ITS WORKING FLUID FEED DEVICE

TECHNICAL FIELD

The present invention relates to a machine tool system and a machining liquid supply device thereof. More particularly, the present invention relates to a machine tool system and a machining liquid supply device thereof capable of most properly achieving the removal of chips and the cooling of a workpiece with a machining liquid by always spouting it from an optimal position, and in an optimal direction, relative to a part of the workpiece being machined during the machining of the workpiece with a tool. The present invention also relates to a machine tool system and a machining liquid supply device capable of spouting a machining liquid in an optimal machining liquid supply mode on a part of a workpiece being machined in accordance with the diameter and machining condition of a tool having peripheral working elements, such as a grinding wheel or various milling cutters, and in accordance with the variation of the positional relation between the tool and the workpiece when machining the workpiece with the tool.

BACKGROUND ART

Especially in the case where a metal workpiece is machined by a tool of a machine tool system, it is essential to supply a machining liquid over the part of the workpiece being machined in order to ensure a satisfactory cooling action for removing the heat generated in the part of the workpiece being machined and to promote the smooth machining action of the tool by removing the chips generated by the machining.

A conventional machining liquid supply device used in a conventional machine tool can be, for example, a grinding liquid supply device disclosed in Japanese Unexamined Utility Model Publication (Kokai) No. 61-124366, which is hereinafter referred to as a first prior art. This publication discloses what may be called a manually operated type of machining liquid supply device, in which a machining liquid nozzle disposed in alignment with a tangent to a grinding wheel at a grinding point is supported on a wheel guard so as to be movable in directions perpendicular to the same tangent to the grinding wheel, so that the machining liquid can be spouted in a direction tangential to the grinding wheel at the grinding point by the operator operating an adjust handle regardless of a change in the diameter of the grinding wheel. The machining liquid supply device according to the first prior art, however, is not perfectly satisfactory because, when the grinding point is changed during a process of grinding a workpiece with a grinding wheel, the machining liquid cannot be spouted in a direction tangential to the grinding wheel at a changed grinding point.

A second prior art is a method of controlling a position of a grinding liquid spouting nozzle which is disclosed in Japanese Unexamined Patent Publication (Kokai) No. 1-146662. More specifically, this patent publication discloses a method in which a grinding liquid spouting nozzle is disposed in such a manner as to be capable of being turned for indexing about a spindle holding a grinding wheel during a contour grinding process with the grinding wheel, and the grinding liquid spouting nozzle is controlled in position to direct it toward a grinding point according to a program for controlling the movement of the grinding wheel during the grinding process. In this conventional method of spouting the grinding liquid according to the second prior art, however, the spouting direction of the grinding liquid is adjusted by turning the grinding liquid spouting nozzle about the spindle when the grinding point where the grinding wheel grinds a workpiece is displaced, and therefore the grinding liquid spouting nozzle is not allowed to move radially with respect to the center of the grinding wheel. Thus, the second prior art teaches nothing about a method of correctly adjusting the grinding liquid spouting direction of the grinding liquid spouting nozzle when the grinding process is performed with a grinding wheel of a different diameter held on the spindle.

A third prior art is a water spouting device for a machining center disclosed in Japanese Unexamined Patent Publication (Kokai) No. 6-31582. This water spouting device for a machining center is capable of versatilely spouting water either in a horizontal direction or vertical direction through a water spouting nozzle to a machining point where the tool of the machining center cuts a workpiece to allow water to be spouted always toward the machining point. This water spouting device is configured such that the water spouting nozzle can be moved about a spindle holding a tool by rotation of a gearing, and when the machining point moves horizontally, the water spouting nozzle can move following the moving angle to spout water toward the machining point. When the machining point changes in height, on the other hand, the base portion of the water spouting nozzle is rotated to move the tip thereof vertically, thereby allowing the water spouting nozzle to spout water toward the machining point.

The water spouting device for a machining center according to the third prior art, however, is not configured to be movable radially with respect to the center of the tool held on the spindle. Therefore, when the diameter of the tool changes, the water spouting direction of the water spouting nozzle, disadvantageously, cannot be adjusted with respect to the machining point with sufficient accuracy.

A fourth prior art is a grinding machine provided with a wheel guard for a grinding wheel, disclosed in U.S. Pat. No. 4,619,078. In this known grinding machine, this wheel guard covers the grinding wheel held on a spindle and carries a machining liquid supply nozzle, which is configured to be turnable about the spindle together with the wheel guard and to be movable radially with respect to the spindle in accordance with the diameter of the grinding wheel, thereby supplying the machining liquid to the contact point between the grinding wheel and the workpiece. Specifically, the machining liquid supply nozzle is turned together with the wheel guard so that the wheel guard and the workpiece do not interfere with each other and, in response to reduced diameter of the grinding wheel due to wearing, the nozzle is adjusted with respect to the wheel guard by driving a motor, thereby to adjust the direction in which the machining liquid is supplied, or to move the wheel guard in a radial direction of the grinding wheel.

The fourth prior art, however, is a special machine tool, such as a surface grinder, and the wheel guard for covering the grinding wheel is an essential component. As a result, an attempt to mount a tool detachably on the spindle by an automatic tool changer such as in a machining center leads to the problem that the automatic tool changing operation cannot be achieved because the wheel guard interferes with the tool changing operation of the automatic tool changer. The disadvantage of this prior art, therefore, is the lack of versatility of applicability to the machining portions of various machine tools other than the surface grinder. Furthermore, the known grinding machine does not have any axis about which the workpiece is rotated, and can feed the workpiece only linearly along three axes, i.e., X-, Y- and Z-axes. Consequently, it has the problem that some workpieces of a particular shape interfere unavoidably with the wheel guard, or that the machining liquid cannot be properly supplied to the machining area if the interference between the workpiece and the wheel guard is avoided. Also, there is no specific disclosure of a structure or an arrangement for rotating or radially moving the wheel guard, or the machining liquid supply nozzle associated with it, in response to the driving force from the motor. Therefore, the utility of this prior art is insufficient in view of practical use.

In addition, the fourth prior art is not provided with any tool measuring means for measuring the diameter of the grinding wheel and nothing is disclosed with regard to techniques of automatically adjusting the radial position of the machining liquid supply nozzle relative to the grinding wheel on the basis of an acquired measurement of the tool diameter of the grinding wheel when the grinding wheel is abraded or the diameter thereof is changed by dressing or truing. Further, an attempt to adjust the circumferential position of the machining liquid supply nozzle about the grinding wheel encounters the problem that the positioning over the entire circumference of the grinding wheel is hampered by the wheel guard.

DISCLOSURE OF THE INVENTION

Accordingly, a principal object of the present a invention is to provide a machine tool system and its machining liquid supply device capable of positioning a machining liquid nozzle included in the machining liquid supply device at an optimal position relative to an engaging area where a tool engages with a workpiece from the viewpoint of chip removal and cooling in accordance with a change in the diameter of a tool detachably mounted on a spindle or a change in a machining point of various machine tools not limited to a specific type of machine tool, while at the same time supplying the machine liquid into the engaging area.

Another object of the present invention is to provide a machine tool system and its machining liquid supply device capable of positioning a machining liquid nozzle of the machining liquid supply device at the optimal machining liquid supply position relative to an area where a tool engages with a workpiece, by moving the machining liquid supply device to a desired machining liquid supply position by means of a rotary mechanism free of a dead angle about a spindle of the machine tool system, and further by positioning the machining liquid nozzle at the optimal machining liquid position in cooperation with a linear movement mechanism for linearly moving the machining liquid nozzle in a radial direction or a turning movement mechanism for turning the machining liquid nozzle.

Further object of the present invention is to provide a machine tool system and its machining liquid supply device capable of starting a machining process, in the case where a tool is reconditioned, after repositioning the machining liquid nozzle automatically following a before-and-after change in a diameter of the reconditioned tool.

Specifically, according to a first aspect of the present invention, there is provided a machine tool system for machining a workpiece by moving a tool mounted on a spindle and the workpiece mounted on a table included in the machine tool system relative to each other in three directions along an X-axis, a Y-axis and Z-axis, which comprises:

a spindle head for rotatably supporting the spindle;
a column for movably supporting the spindle head;
a tool mounting means for detachably mounting the tool on the spindle;

a machining liquid supply means including a machining liquid nozzle for spouting a machining liquid toward a machining area where the tool engages with the workpiece, and connected by piping to a machining liquid source;

a cylindrical supporting means disposed in an area surrounding the circumference of the spindle for movably supporting the machining liquid nozzle of the machining liquid supply means;

a radial moving means for positioning, in a radial direction of the tool, the machining liquid nozzle of the machining liquid supply means supported on the cylindrical supporting means, by linearly moving or turning the machining liquid nozzle with respect to the tool; and a circumferential moving means for positioning the machining liquid nozzle of the machining liquid supply means over the entire circumference of the tool by rotating the cylindrical supporting means.

Preferably, the radial moving means comprises a rack located on the machining liquid nozzle of the machining liquid supply means, a pinion movable relative to the cylindrical supporting means and in mesh with the rack, a worm wheel movable relative to the cylindrical supporting means together with the pinion, a worm in mesh with the worm wheel, and a linear movement motor fixed on the column for driving to rotate the worm.

Preferably, the radial moving means comprises a pinion located on the machining liquid nozzle of the machining liquid supply means, a worm wheel having a pinion in mesh with the pinion and being movable relative to the cylindrical supporting means, a worm in mesh with the worm wheel, and a turning movement motor fixed on the column for driving to rotate the worm.

Preferably, the circumferential moving means comprises a worm wheel integrated with the cylindrical supporting means, a worm in mesh with the worm wheel, and a rotating movement motor fixed on the column for driving to rotate the worm.

Preferably, the system further comprises a rotary table having at least one rotational feed shaft and a work rotating means for rotationally feeding the workpiece mounted on the rotary table.

In addition, preferably, in the case where the tool mounted on the spindle is a grinding wheel, the machine tool system further comprises a tool measuring means located in a part of a structure of the machine tool system for measuring a diameter or a tip position of the grinding wheel mounted on the spindle.

Moreover, preferably, in the case where the tool mounted on the spindle is a grinding wheel, the machine tool system further comprises a tool reconditioning means located on the column for truing or dressing an outer peripheral portion of the grinding wheel mounted on the spindle.

According to a second aspect of the present invention, there is provided a machining liquid supply device of a machine tool system for supplying the machining liquid to a machining area where a tool mounted on a spindle engages with a workpiece mounted on a table included in the machine tool system, which comprises:

a machining liquid supply means including a machining liquid nozzle for spouting the machining liquid toward the machining area and connected by piping to a machining liquid source;

a cylindrical supporting means disposed in an area surrounding the circumference of the spindle for movably supporting the machining liquid nozzle of the machining liquid supply means;

a radial moving means for positioning, in a radial direction of the tool, the machining liquid nozzle of the machining liquid supply means supported on the cylindrical supporting means, by linearly moving or turning the machine liquid nozzle with respect to the tool; and a circumferential moving means for positioning the machining liquid nozzle of the machining liquid supply means over the entire circumference of the tool by rotating the cylindrical supporting means.

Preferably, the radial moving means comprises a rack located on the machining liquid nozzle of the machining liquid supply means, a pinion movable relative to the cylindrical supporting means and in mesh with the rack, a worm wheel movable relative to the cylindrical supporting means together with the pinion, a worm in mesh with the worm wheel, and a linear movement motor fixed on the column for driving to rotate the worm.

Preferably, the radial moving means comprises a pinion located on the machining liquid nozzle of the machining liquid supply means, a worm wheel having a pinion in mesh with the pinion and being movable relative to the cylindrical supporting means, a worm in mesh with the worm wheel, and a turning movement motor fixed on a part of a structure of the machine tool system for driving to rotate the worm.

Preferably, the circumferential moving means comprises a worm wheel integrated with the cylindrical supporting means, a worm in mesh with the worm wheel, and a rotating movement motor fixed on a part of a structure of the machine tool system for driving to rotate the worm.

By provision of the cylindrical supporting means for movably supporting the machining liquid nozzle of the machining liquid supply means for spouting the machining liquid toward the machining area where the tool engages with the workpiece, on the area surrounding the circumference of the spindle supported rotatably on the spindle head, the present invention can achieve operations of linearly moving or turning the machining liquid nozzle of the machining liquid supply means in the radial direction of the tool by means of the radial moving means located on the cylindrical supporting means, and rotating the machining liquid nozzle of the machining liquid supply means over the entire circumference about the tool, thereby positioning the machining liquid nozzle so as to spout the machining liquid toward the machining area.

The machine tool system and the machining liquid supply device according to the invention having the arrangement and operations as described above, in performing the machining process such as grinding or cutting on the workpiece W by a machining tool T such as a grinding wheel or a milling cutter of the machine tool MT, can supply and spout the machine liquid through the machining liquid supply nozzle of the machining liquid supply device to the machining area or the contact area P of the tool T from the optimum machining liquid supply position, i.e. from the most proper position for removing the machining chips and cooling both the tool T and the workpiece W. Further, when setting the opening end of the machining liquid supply nozzle in most proper position and orientation for optimal machining liquid supply, the machining liquid supply device itself can be rotated over the entire circumference about the rotational axis of the spindle. Therefore, the setting of the position and orientation can be performed without any difficulty in spite of the change in any of the various conditions such as the shape and the limitation of the installation of the workpiece W.

It should be understood from the foregoing description that the present invention is not limited to the grinding machine for performing the grinding process but is applicable as it is to the other machine tool system such as a cutting machine using a milling cutter with equal effect.

In addition, according to the present invention, even if the diameter of the tool in use is changed by the exchange of the tools T such as the grinding wheel T using the tool changing means or the wear of the tool in use causes the change in the diameter thereof, the tool diameter can be measured and the setting of the position and orientation of the machining liquid supply nozzle of the machining liquid supply device can be properly adjusted and moved on basis of the measured tool diameter. In this way, the machining liquid can be always supplied from the optimal position to the machining area of the tool.

As described above, in view of the fact that the position for supplying the machining liquid to the machining area of the tool of the machine tool system can be always set in an optimal condition for cooling function and chip removal function, both the machining accuracy and the surface roughness can be remarkably improved in the machining operation applied by the tool T to the workpiece W. Further, the machining tool can be always properly and effectively cooled while at the same time removing the chips. This can decrease the wearing of the tool and results in a reduced machining cost.

Also, this invention is so configured that the setting and the positioning of the machining liquid supply nozzle of the machining liquid supply device can be automatically achieved in both radial and circumferential directions with respect to the axis of the spindle, respectively, by the rotating movement means and linear movement or turning movement means including a driving motor with a servo motor as a driving source. The application of the invention to the automatic machine tool such as a machining center, therefore, can contribute to the optimization of the automatic supply of the machining liquid.

Comparison of the present invention with the above-mentioned four prior art will be described below. The first prior art is so configured that the position of the machining liquid nozzle can be adjusted only in a direction along the diameter, i.e. radially of the tool (grinding wheel). The second and third prior art are so configured that the position of the machining liquid supply nozzle can be adjusted only in a circumferential direction, i.e. in a direction tangential to the tool (grinding wheel) at the machining point. According to the present invention, in contrast, the position of the machining liquid nozzle can be adjusted in both radial and circumferential directions of the tool, and therefore the machining liquid can be supplied from the optimal position in response to the change in the tool diameter or the machining point. Further, the fourth prior art is so configured that the position of the machining liquid nozzle can be adjusted in both the radial and circumferential directions of the tool, but the adjustment of the circumferential position is limited. In contrast, the present invention is free of such a limitation of the position of adjusting the machining liquid nozzle in the circumferential direction of the tool, and configured so that the position adjustment is possible over the entire circumference of the tool. Therefore, the machining liquid can be supplied properly without any dead angle.

BRIEF DESCRIPTION OF THE DRAWINGS

The above and other objects, features and advantages of the present invention will be further explained below in conjunction with the accompanying drawings, wherein.

BEST MODE FOR CARRYING OUT THE INVENTION

Figure 1:
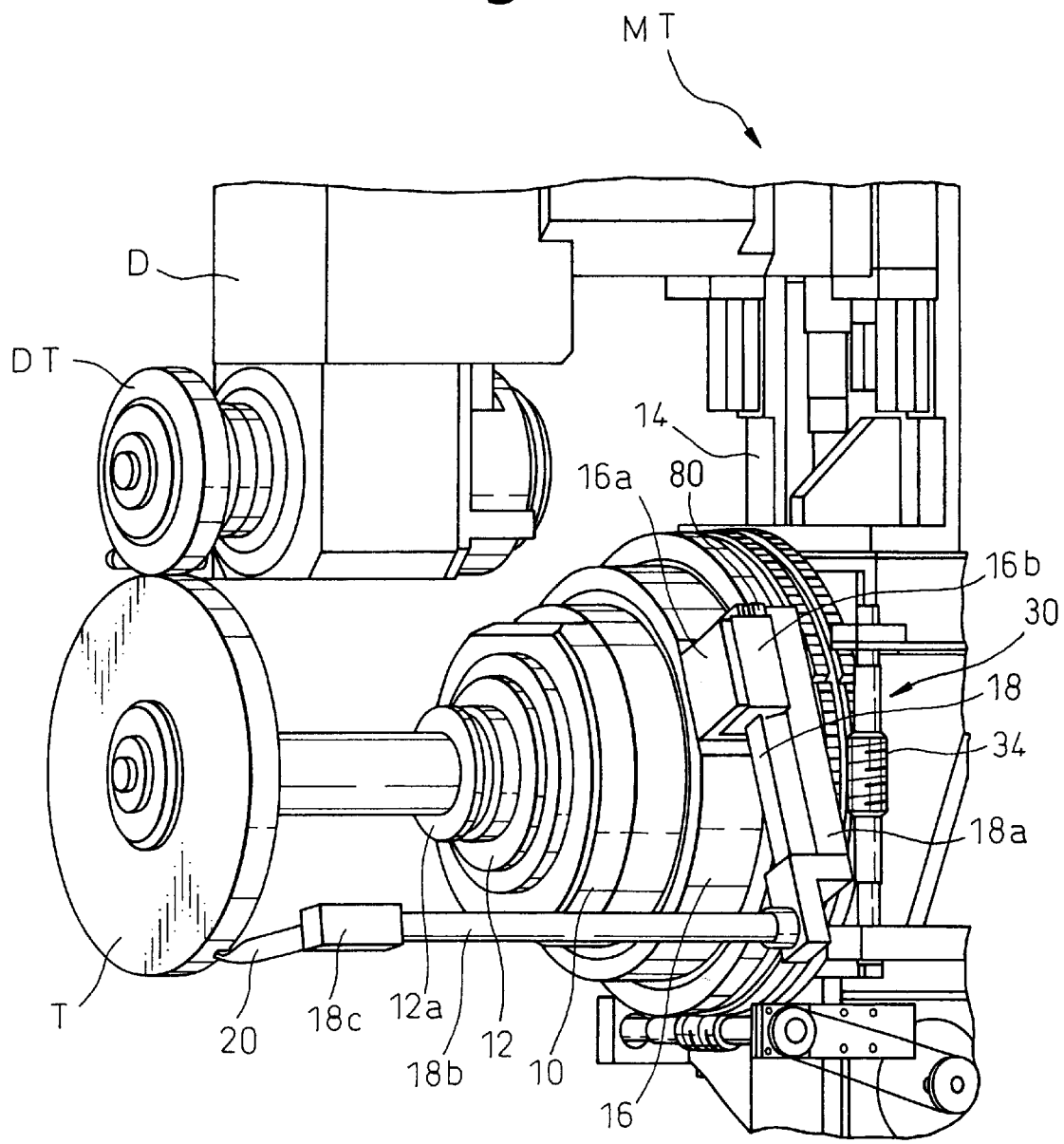
FIG. 1 is a perspective view showing a configuration of an essential part of a machine tool system constituting a grinding machine having a machining liquid supply device for supplying a machining liquid to a portion ground by a grinding wheel according to an embodiment of the present invention.
Figure 2:
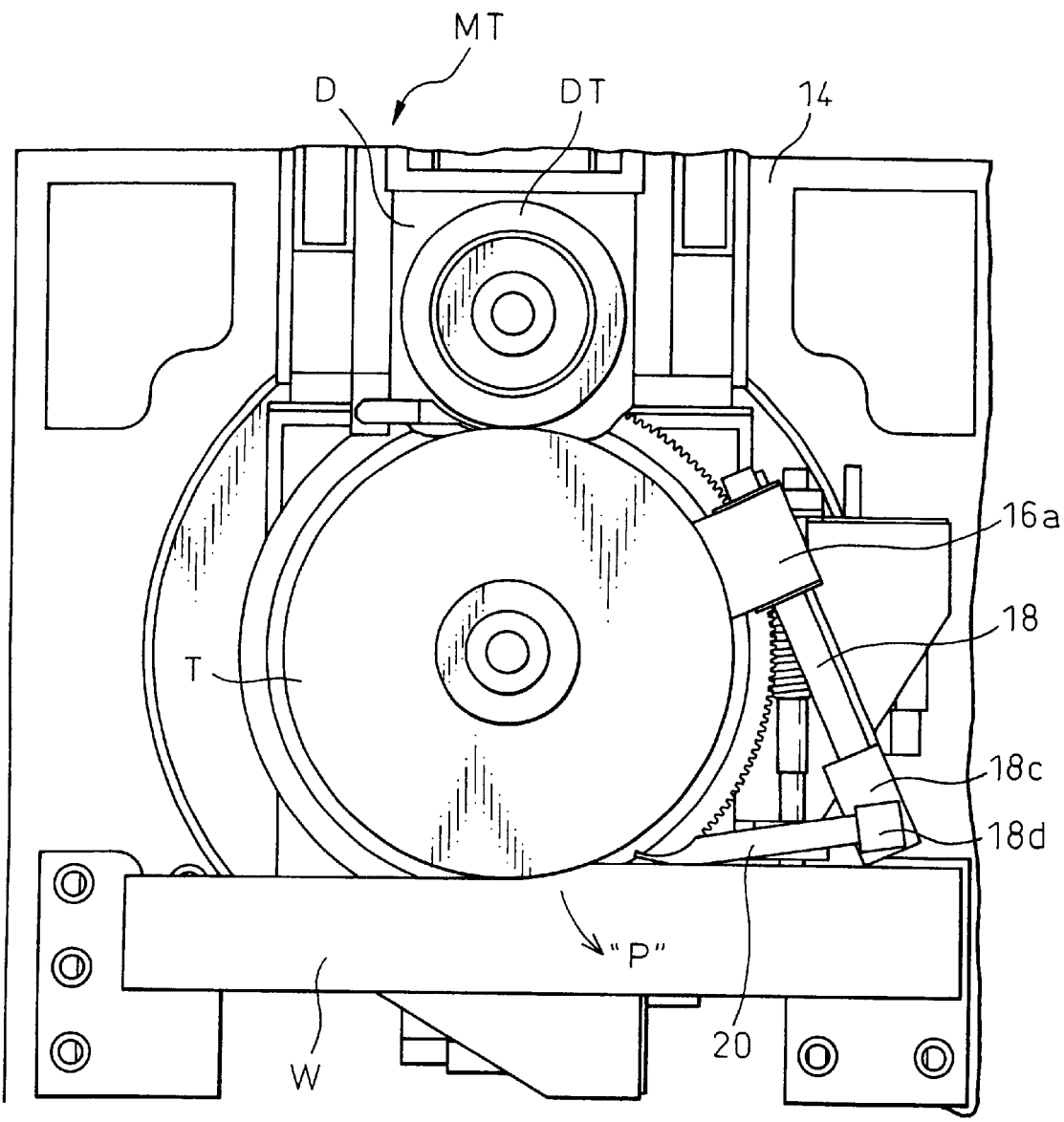
FIG. 2 is a partial front view showing the relation between a machining liquid supply nozzle of the machining liquid supply device and the portion of the workpiece grinded by the grinding wheel, and the positional relation between the grinding wheel and a tool reconditioning means for truing or dressing a tool such as the grinding wheel as viewed from the front side of a spindle of the grinding machine shown in FIG. 1.

First, referring to FIGS. 1 and 2, a machine tool MT is shown as a grinding machine according to an embodiment thereof. The machine tool MT has a spindle head 10, and a spindle 12 is supported for high speed rotation in the spindle head 10. A grinding wheel or tool, i.e., an example of a tool T, is mounted on a tool mount 12a of the spindle 12. The spindle head 10 is mounted on a machine column 14 so that it can be moved relative to the bed, not shown, together with the machine column 14 or can be moved relative to the machine column 14, in directions parallel to two orthogonal axes (i.e., X- and Y-axes) as shown. The respective movements of the spindle head 10 and the spindle 12 supported by the spindle head 10 in directions parallel to those two orthogonal axes are detected by position detectors (not shown), such as scales, arranged on the machine tool; and associated with those two axes, respectively.

Also, the machine tool MT, i.e., the grinding machine according to this embodiment thereof, is provided with a tool reconditioning unit D capable of performing the tool reconditioning process, while the grinding process is going on, by truing or dressing the grinding wheel or tool mounted on the spindle 12 through the tool mount 12a. A dresser tool DT is mounted on the foremost portion of the tool adjusting unit D.

The machine tool MT is further provided with a cylindrical supporting body 16 arranged rotatably by means of a bearing unit described later in an area surrounding the spindle head 10. The machining liquid supply device 18 is carried on the cylindrical supporting body 16 so as to be rotatable about the center axis of spindle head 10, i.e. about the rotational center axis of the spindle 12, along with the rotation of the cylindrical supporting body 16.

This machining liquid supply device 18 is provided with a machining liquid receiving unit 18a connected to a machining liquid source (not shown), a piping unit 18b and a machining liquid supply nozzle 20 mounted at the forward end 18c of the piping unit 18b through an appropriate rotatable connector 18d (see FIG. 2). The machining liquid is discharged and supplied from an opening end of the machining liquid supply nozzle 20 toward the machining portion between the tool T and the workpiece W (see FIG. 2), i.e. toward the contact area P between the grinding wheel T and the workpiece W.

Figure 3:
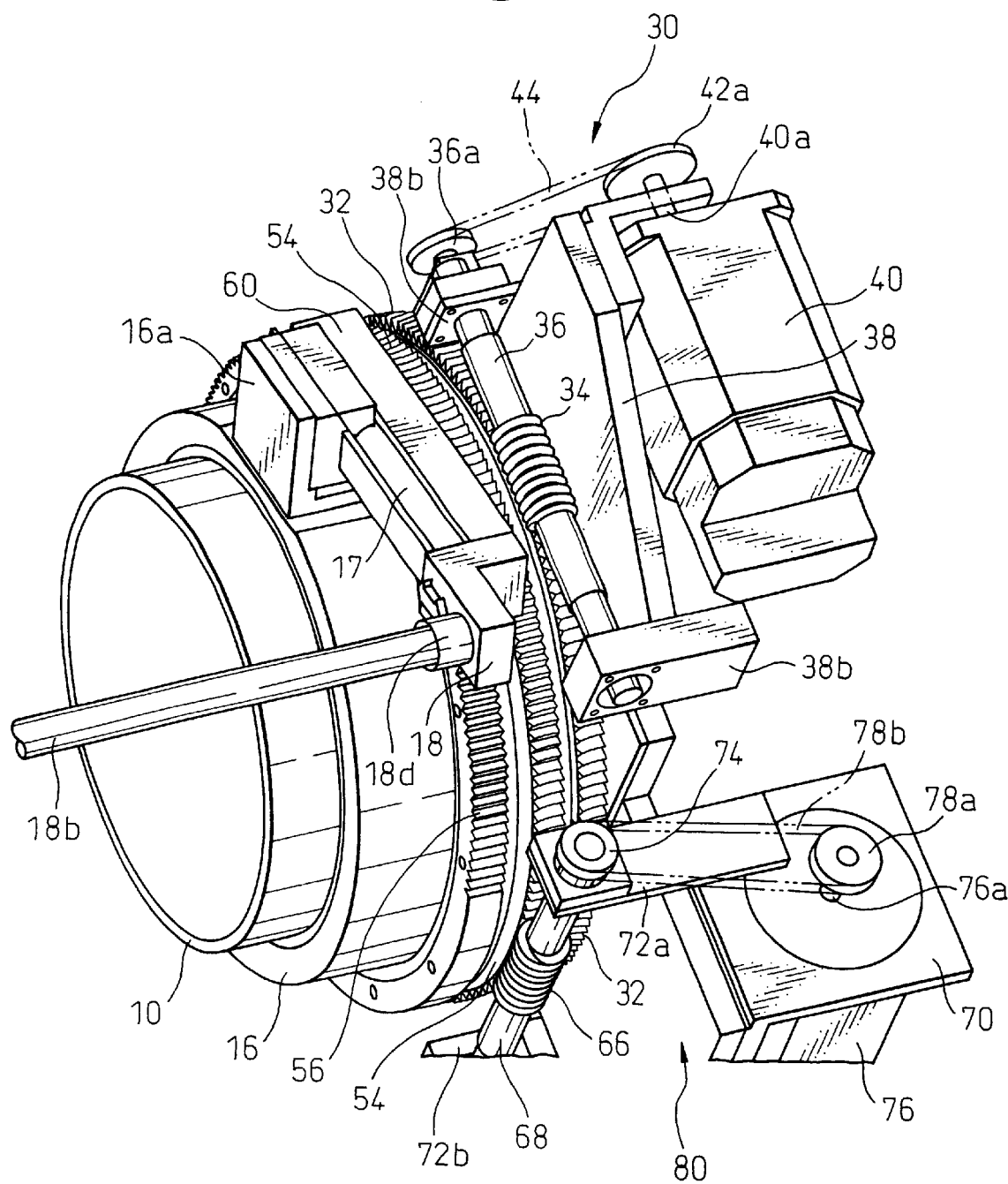
FIG. 3 is a perspective of an essential part, showing cylindrical supporting means arranged on an area surrounding the circumference of the spindle rotatable within the spindle head of the grinding machine, the cylindrical supporting means being adapted to support the machining liquid supply device having a machining liquid supply nozzle movably in two directions, i.e., in circumferential and radial directions, by linear movement means and rotating movement means.
Figure 4:
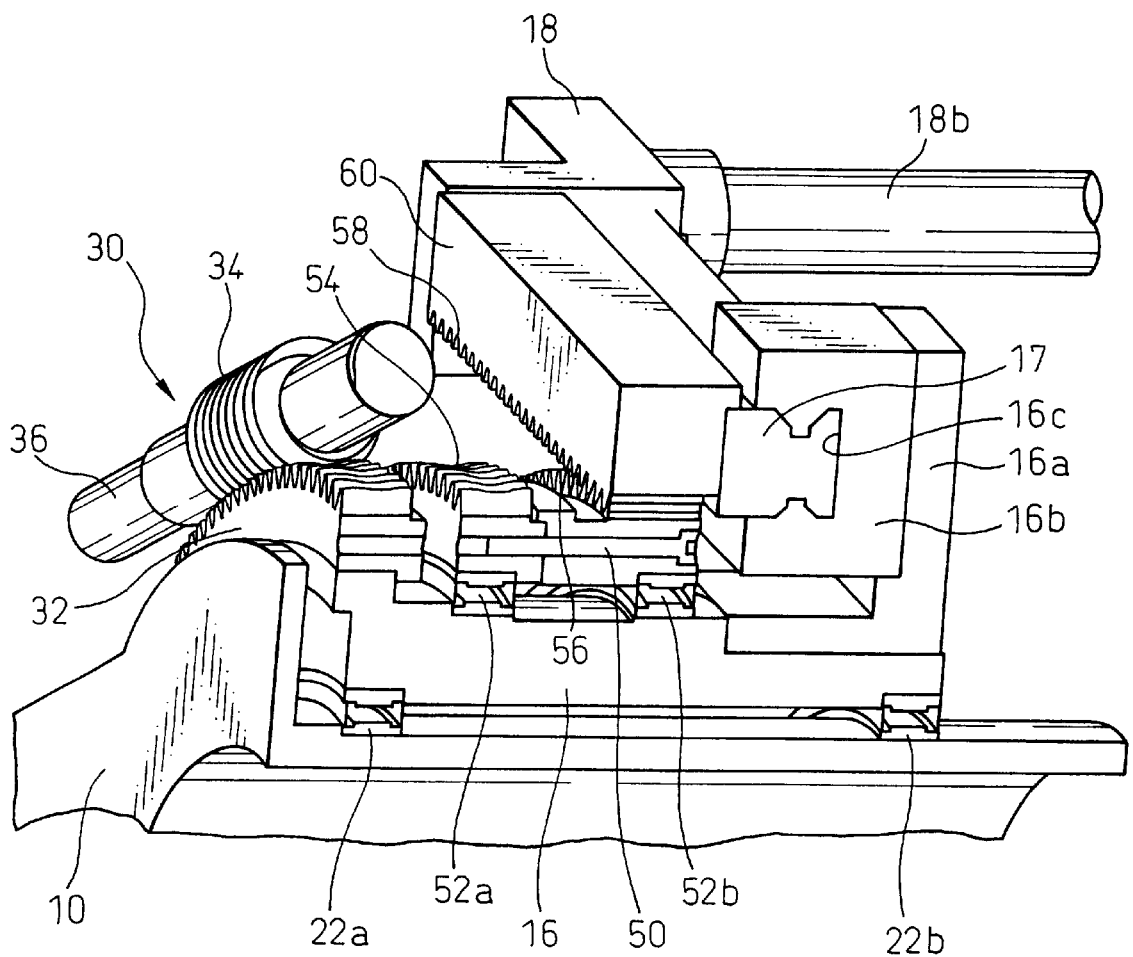
FIG. 4 is a perspective sectional view of an essential part, showing an engagement between a worm and a worm wheel making up the rotating movement means and the linear movement means and an engagement between a rack and a pinion, thereby to allow the machining liquid supply device to be moved in the circumferential direction and radial direction, respectively.

The contact area P between the grinding wheel T and the workpiece W is displaced every moment with the progress of the grinding process and the abrasion of the grinding wheel T. Both of a rotating movement mechanism (rotating movement means) and a linear movement mechanism (linear movement means) for setting a position and a orientation of the machining liquid supply nozzle 20 moves the machining liquid supply nozzle 20 via the cylindrical supporting body 16 to always direct the opening end of the machining liquid supply nozzle 20 of the machining liquid supply device 18 of the machine tool MT toward the contact area P, under the optimum conditions for supplying the machining liquid, i.e. in such a manner as to follow the displacement of the contact area P during the progress of the grinding process on the workpiece W. Now, these two mechanisms will be explained with reference to FIGS. 1 and 2 as well as to FIGS. 3 and 4.

The cylindrical supporting body 16 for carrying the machining liquid supply device 18 is mounted around the spindle head 10 by means of rotary bearings 22a, 22b (see FIG. 4) such as well-known ball bearings or the like in such a manner as to be rotatable through 360° about the axis of the spindle head 10 and the spindle 12 as described above, i.e. over the entire circumference of the spindle head 10 and the spindle 12. Along with the rotation of the cylindrical supporting body 16, therefore, the machining liquid supply device 18 can be also rotated through 360° over the entire circumference about the axis of the spindle head 10 and the spindle 12.

On the other hand, a linear guide portion 16a is formed as an L-shaped outward protrusion in the radial direction on a part of the front edge of the cylindrical supporting body 16. The machining liquid supply device 18 is integrally coupled with a linear rod 17 fitted linearly slidably into a linear guide groove 16 formed in a guide block 16b of a linear guide portion 16a, thereby allowing the machining liquid supply device 18 to be linearly movable. The linear movement of the machining liquid supply device 18 is designed and preset to move the machining.liquid supply nozzle 20 in radial direction toward and away from the axis of the spindle 12. As a result, the opening end of the machining liquid supply nozzle 20 shown in FIG. 1 is movable in radial direction toward and away from the rotational axis of the grinding wheel T mounted on the spindle 12.

The first worm wheel 32 of the cylindrical supporting body 16 making up the rotating movement mechanism 30 is fixedly attached, by appropriate fixing means, on the side of the rear edge axially spaced from the side of the front edge having the linear guide portion 16a of the cylindrical supporting member 16. The first worm 34 is in mesh with the first worm wheel 32. By rotationally driving the first worm 34, the rotating force is applied to the first worm wheel 32, with the result that the cylindrical supporting body 16 is rotatable through 360° about the axis of the spindle head 10 and the spindle 12 by means of the rotary bearings 22a, 22b. In the process, the shaft 36 of the first worm 34 is rotatably held by means of an appropriate rotary bearing between a pair of rotation holding portions 38a, 38b located on a bracket 38 mounted on the spindle head 10, as clearly shown in FIG. 3. A pulley 36a is mounted at an end of the shaft 36 of the first worm 34, while a driving motor 40 such as a servo motor is held on the bracket 38. A pulley 42a is mounted at the forward end of the output shaft 40a of the driving motor 40. The pulley 42a on the side of the driving motor 40 and the pulley 36a on the side of the first worm 34 are connected by a well-known timing belt 44, so that the first worm 34 is rotated by the rotating force of the driving motor 40.

Specifically, the rotating movement mechanism 30 for rotationally moving the machining liquid supply nozzle 20 of the machining liquid supply device 18 via the cylindrical supporting body 16 includes a belt-and-pulley mechanism having the driving motor 40, the timing belt 44 and the pulleys 36a, 42a, the first worm 34 and the first worm wheel 32. In this way, by controlling the rotation of the driving motor 40 and the driving motor 50 synchronously, the amount of rotating movement of the cylindrical supporting body 16 about the axis of the spindle can be controlled over the entire circumference to locate and set the supporting body 16 in a desired circumferential position.

A cylindrical gear carrier 50 is located at an intermediate portion between the front and rear ends of the cylindrical supporting body 16 so as to be rotatable about the axis of the spindle head 10 and the spindle 12 with respect to them by means of ball bearings 52a, 52b. A second worm wheel 54 is fixedly attached in parallel to the first worm wheel 32 on the outer periphery of the gear carrier 50. In other words, the second worm wheel 54 is mounted on the gear carrier 50 to be rotatable together with the gear carrier 50. A pinion 56 is also fixedly attached on the gear carrier 50 in parallel to the second worm wheel 54. Rack teeth 58 formed on an inner surface of a rack 60 are in mesh with the pinion 56 as clearly shown in FIG. 4. At the same time, the rack 60 is coupled to the linear rod 17 described above by appropriate fixing means such as a bolt and therefore integrated with the machining liquid supply device 18. Thus, the rotation of the gear carrier 50 linearly moves the rack 60 in a longitudinal direction thereof because of the mesh of the rack 60 with the pinion 56. As a result, the machining liquid supply device 18 integrated with the rack 60 via the linear rod 17 is moved linearly, so that the machining liquid supply nozzle 20 linearly moves in radial direction of the spindle head 10 and the spindle 12 with respect to their center axes. A second worm 66 is in mesh with the second worm wheel 54, as is clearly shown in FIG. 3. The second worm 66 has a shaft 68 and is rotatably mounted, by means of a rotary bearing (not shown), to a pair of holders 72a, 72b located on the bracket 70 mounted on the spindle head 10. A pulley 74 is fixedly attached at one end of the shaft 68 of the second worm 66, while a pulley 78a is mounted at the forward end of the output shaft 76a of the driving motor 76 such as a servo motor held on the bracket 70. A timing belt 78b is put in tension between the pulley 78a and the pulley 74 of the second worm 66. As a result, by controlling the rotation of the driving motor 76, the machining liquid nozzle 20 of the machining liquid supply device 18 is driven in a radial direction of the spindle head 10 and the spindle 12 with respect to their center axes, as described above, by the belt-and-pulley mechanism including the timing belt 78b and the pulleys 74, 78a and by the linear movement mechanism 80 including the second worm 66, the second worm wheel 54, the pinion 56 and the rack 60. In the process, it is necessary to stop the driving motor 40 rotating the first worm wheel 32 in order to lock the cylindrical supporting body 16. It is of course possible to reverse the rotational direction of the second worm wheel 54 and the pinion 56 so that the machining liquid nozzle 20 moves toward or away from the center axis of the cylindrical supporting body 6 in radial direction.

For moving the machining liquid supply nozzle 20 linearly toward or away from the center axis of the spindle 12, the length of the rack 60, the size and the number of the rack teeth 58 and the teeth of the pinion 56 may be appropriately selected and designed in accordance with a required maximum range and minimum unit of linear movement depending on a maximum value of a diameter T of a grinding wheel to be used. The pinion 56 may be also formed as a partial gear, as required.

Both of the rotating movement mechanism 30 and the linear movement mechanism 80 for moving the machining liquid supply nozzle 20 of the machining liquid supply device 18 rotationally and linearly, respectively, are adapted to carry the driving motors 40, 76 on the brackets 38, 70 located in the outer peripheral area surrounding the circumference of the spindle head 10 having the cylindrical supporting body 16 mounted rotatably thereon, while at the same time being adapted to drive to rotate, by means of the relatively smaller first and second worms 34, 66, the cylindrical supporting body 16 and the first and second worm wheels 42, 54 mounted thereon. Therefore, the rotation of the cylindrical supporting body 16 is not mechanically interfered with by any members or mechanical parts. As a result, this allows the machining liquid supply device 18 and the machining liquid supply nozzle 20 to be rotated through 360° over the entire circumference about the axis of the spindle 12. Further, in combination with the linear movement of the liquid supply device 18 in the radial direction, the opening end of the machining liquid supply nozzle 20 can be positioned and set in an optimum position and orientation for supplying the machining liquid to the contact area P between the grinding wheel T and the workpiece W.

An embodiment different from the aforementioned embodiment will be explained with reference to FIG. 5. Reference numerals similar to those of the embodiment shown in FIGS. 1 to 4 described above will not be explained.

Figure 5:
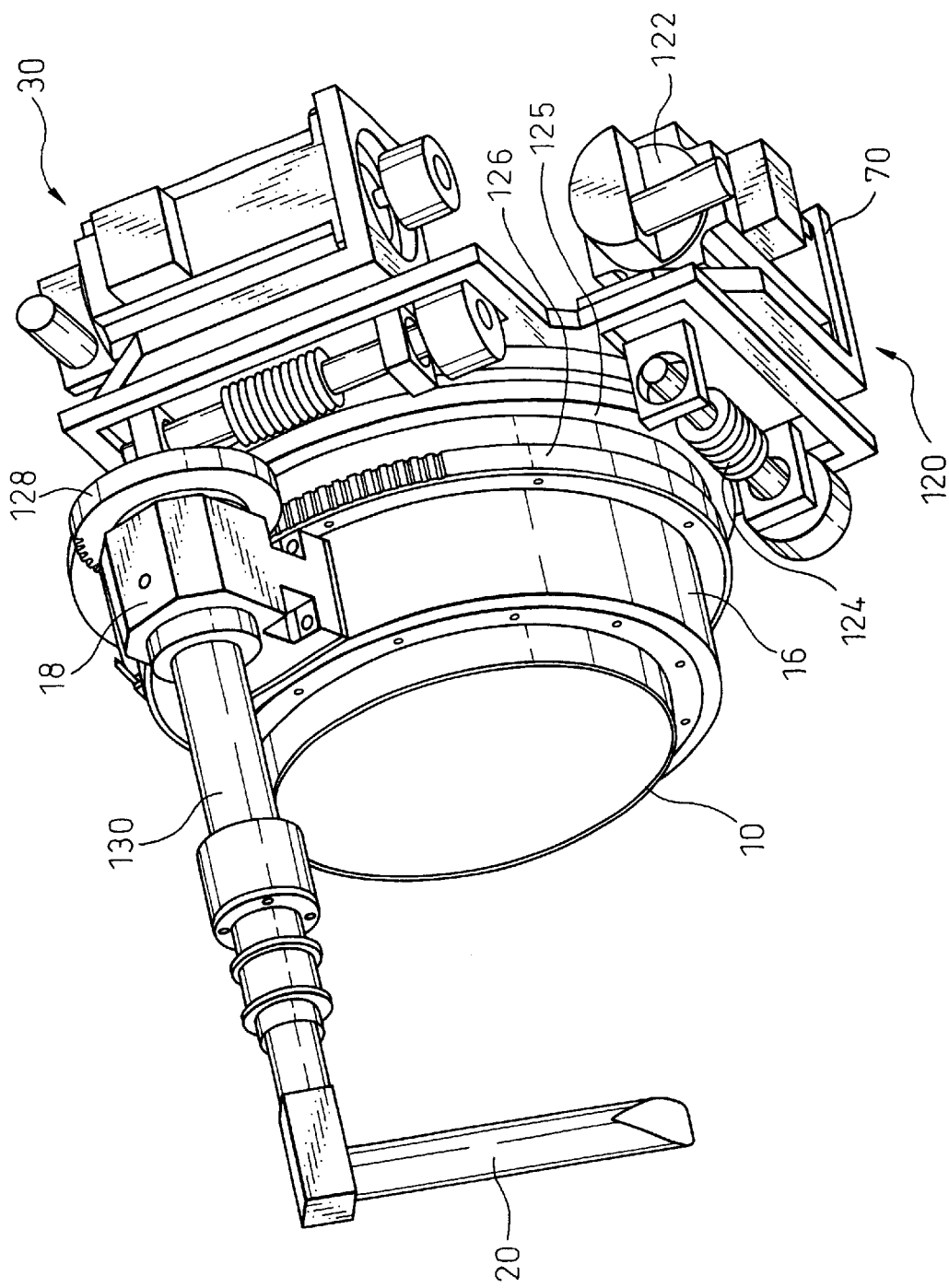
FIG. 5 is a perspective view of an essential part, showing cylindrical supporting means arranged on an area surrounding the circumference of the spindle rotatable within the spindle head of the grinding machine, the cylindrical supporting means being adapted to support the machining liquid supply device having a machining liquid supply nozzle movably in two directions, i.e., in circumferential and radial directions, by turning movement means and rotating movement means.

The embodiment shown in FIG. 5 and the embodiment shown in FIGS. 1 to 4 are different in the provision of a turning movement mechanism 120 instead of the linear movement mechanism 80. The turning movement mechanism 120 is adapted to carry a driving motor 122 by the bracket 70 located in the outer peripheral area surrounding the spindle head 10 having the cylindrical supporting body 16 rotatably mounted thereon, and to drive to rotate a third worm wheel 126 mounted on the cylindrical supporting body 16, via the third worm 124. The driving force of the driving motor 122 is transmitted to the third worm 124, as in the linear movement mechanism 80, by a belt-and-pulley mechanism. A pinion 126 is integrated with the third worm wheel 125 and is in mesh with a pinion 128. A shaft portion 130 having the machining liquid supply nozzle 20 at the forward end or the tip thereof is integrated with the pinion 128 and is rotatably supported by means of a well-known bearing or the like inside the machining liquid supply device 18. Specifically, the shaft 130 having the machining liquid supply nozzle 120 is adapted to turn about the axis thereof through the third worm 124, the third worm wheel 125, the pinion 126 and the pinion 128, by driving the driving motor 122.

According to this embodiment, a combination of the turning movement by the turning movement mechanism 120 and the rotating movement by the rotating movement mechanism 30 achieve the positioning of the machining liquid supply nozzle 20 with respect to the contact area P between the grinding tool T and the workpiece W. The difference of this embodiment from the aforementioned one is that the machining liquid supply nozzle 20 is positioned in the radial direction of the grinding tool T by the turning movement mechanism 120. Specifically, the synchronous operation of the rotating movement mechanism 30 and the turning movement mechanism 120 makes it possible to position the machining liquid supply nozzle 20 with respect to the contact area P between the grinding tool T and the workpiece W.

The positioning of the machining liquid supply nozzle 20 in circumferential direction of the grinding tool T by the rotating operation of the rotating movement mechanism 30 and the positioning of the machining liquid supply nozzle 20 in the radial direction of the grinding tool T by the turning operation of the turning movement mechanism 120 can be performed separately from each other. Also, the sequence of the operations is not specifically limited. Even the provision of the turning movement mechanism 120 still allows the machining liquid supply nozzle 20 to be rotated through 360° over the entire periphery of the spindle 12 about the axis of the spindle 12 without any interference, as in the embodiment described above.

In the case where the workpiece W is ground with the machining liquid supplied from the machining liquid supply device 18 of the machine tool (grinding machine) MT, the surface grinding of the workpiece W can be performed with the machining liquid supplied thereto under substantially the optimum condition, if the spindle head 10 is adapted to be movable in the directions along two orthogonal axes with respect to the column 14 and provided is a work table (not shown) which can move the workpiece W in the direction of Z-axis, i.e., the direction of the other one axis orthogonal to the aforementioned two orthogonal directions (X- and Y-axes) in a plane, so that the workpiece W placed on this work table is ground using the grinding wheel T.

Figure 6:
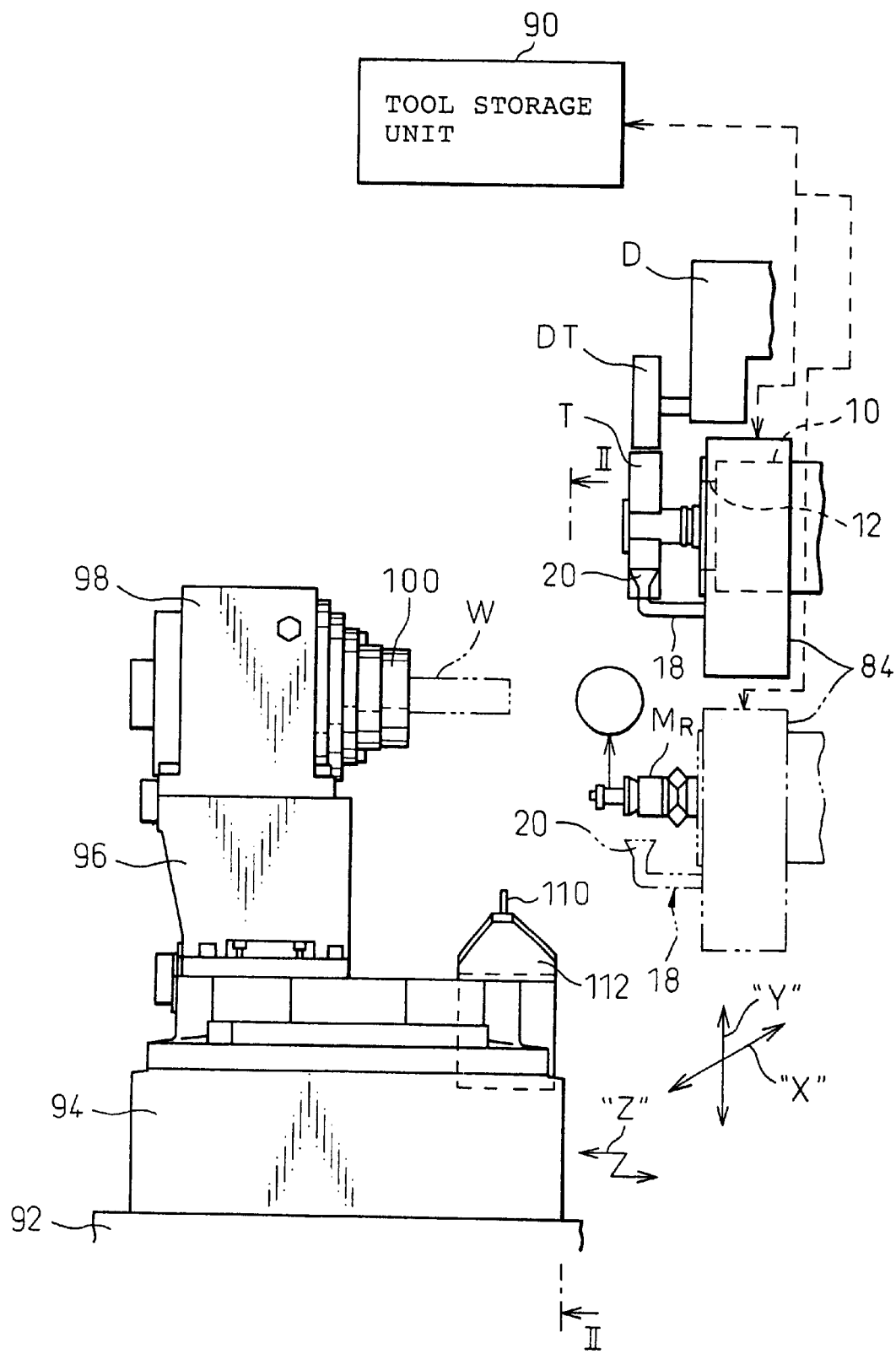
FIG. 6 is a front view showing a configuration of a grinding machine according to an embodiment of the present invention, which includes a spindle head having a spindle with a grinding wheel mounted thereon and a bed with a workpiece and a tool measuring means mounted thereon.
Figure 7:
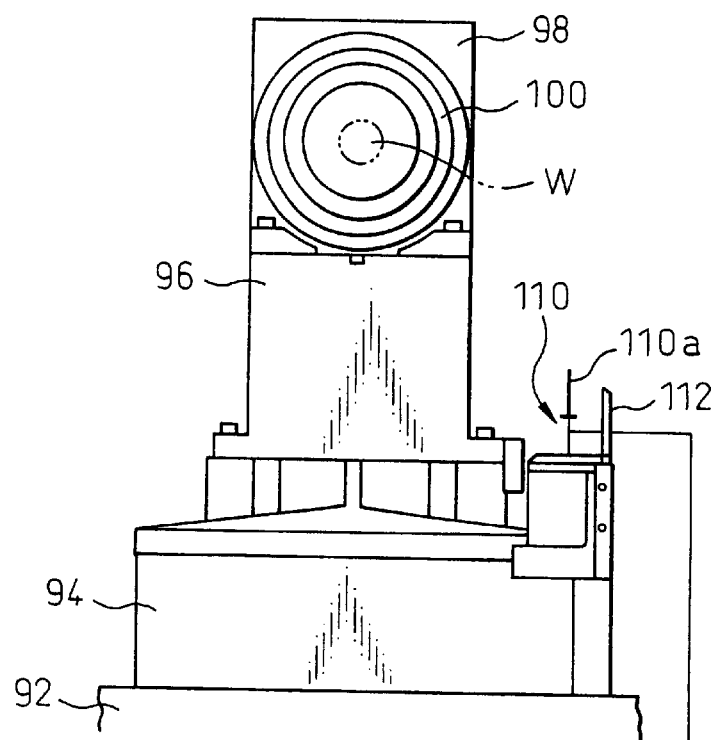
FIG. 7 is a side view showing an arrangement of tool measuring means and a workpiece-mounting rotary head mounted on the bed of FIG. 6 through a rotary head base.
Figure 7:
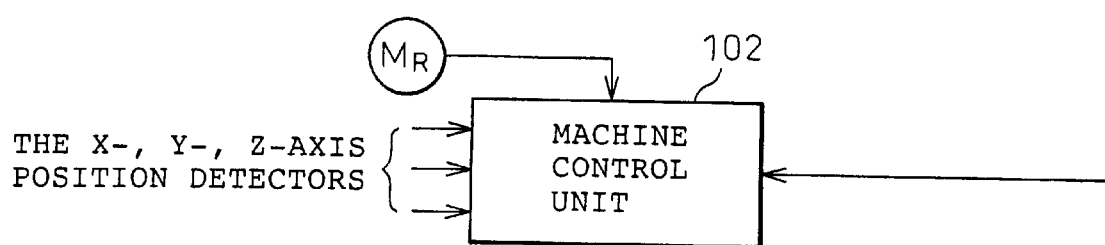

On the other hand, another embodiment of a machine tool MT is shown in FIGS. 6 and 7, in which a work table capable of moving the workpiece W only in one direction along Z-axis is replaced by a rotary table not only capable of feeding the workpiece W placed thereon along Z-axis in a plane but also capable of rotating the workpiece W about, for example, a horizontal axis, and in which the workpiece W is mounted on this rotary table and the grinding wheel T of variously different diameters stored in a tool storage means are selectively changed and mounted on the spindle 12 thereby to carry out the desired grinding process. In this embodiment, the same component elements as those of the machine tool shown in FIGS. 1 to 5 are designated by the same reference numerals, respectively.

Referring to FIGS. 6 and 7, the machine tool MT is provided with a tool storage unit 90 such as a well-known tool magazine and the like, as described later. Either one of the tools (grinding wheels) T stored in the tool storage unit 90 or a work measuring device $M_R$ capable of measuring the external dimensions and the shape of a workpiece by direct contact can be detachably mounted on the spindle 12 supported in the spindle head 10 by a tool changing means (not shown) such as a well-known tool changing arm. The continuous lines in the upper part of FIG. 6 show a state in which a grinding wheel T, i.e., an example of a tool T, taken out from the tool storage unit 90 is mounted on the spindle 12 by the tool changing means, while the broken lines in the lower part of FIG. 6 show a state in which the work measuring device $M_R$ is, mounted on the spindle 12.

On the other hand, a table 94 is mounted on the bed 92 opposite to the spindle head 10 so as to be movable in one direction (along Z-axis) orthogonal to the aforementioned directions along the two axes. A rotary head 98 is mounted on the table 94 through a rotary head base 96. The workpiece W to be machined is gripped by a work gripping device 100 rotatable for indexing and held in a central portion of the rotary head 98. The work gripping device 100 can be turned for indexing by a driving motor (not shown) such as a servo motor encased in the rotary head 98.

The machine tool MT is connected to a machine control unit 102. In accordance with an instruction from the machine control unit 102, the machining liquid supply device 18 described above is set in position and orientation, and otherwise the operation of all the movable parts of the machine can be controlled.

Also, an automatic tool measuring device 110 is located at a predetermined position on the table 94. Specifically, the automatic tool measuring device 110 is disposed at a predetermined reference position with respect to X-, Y- and Z-axes on the table 94, and the reference position data (coordinates on a coordinate system defined by X-, Y- and Z-axes) is known as reference position data in advance. As shown in FIG. 7, the automatic tool measuring device 110 can be stored inside the table 94 to avoid damage and then covered with a lid 112. The automatic tool measuring device 110 has, at the forward end thereof, a measuring tip 110a such as a probe formed of a hard material. The movements of the spindle head 10 and the machine column 14 in two directions along X- and Y-axis directions and the movement of the table 94 along Z-axis bring the tool T (grinding wheel) held on the spindle 12 into contact with the measuring tip 110a of the automatic tool measuring device 110 thereby to measure the outer diameter of the grinding wheel T. Specifically, the reference position data on the reference position of the measuring tip 110a of the automatic tool measuring device 110 with respect to the bed 92 in the directions along X-, Y- and Z-axes are stored beforehand as known data in the machine control unit 102. Thus, by supplying the machine control unit 102 with the position data of the measuring tip 110a with respect to X-, Y- and Z-axes input from the position detector on the machine at the time when the grinding wheel T comes into contact with the measuring tip 110a, the actual measurement of the outer diameter of the grinding wheel T can be determined by calculations.

Also in the case where the work measuring device $M_R$ is mounted on the spindle 12 as described above, the position of the center of the spindle 12 is stored in the machine control unit 102 as known data. Thus, when the spindle 12 and the table 94 relatively approach each other in the directions along the three axes (X-, Y- and Z-axes) and thereby the measuring tip of the work measuring device $M_R$ comes into contact with the outer surface of the workpiece W mounted in the work gripping device 100, the external dimensions of the workpiece W can be determined by simple arithmetic operations in the machine control unit 102 from the measured movement of the spindle 12 and the known data on the reference position of the spindle 12. In the process, the automatic tool measuring device 110 can of course be a non-contact measuring device capable of measuring the dimensions of the workpiece without touching the workpiece W.

In the machine tool according to this embodiment of the present invention, the machining liquid supply device 18 and the tool reconditioning unit D for truing or dressing the tool are installed constantly in the area surrounding the circumference the spindle head 10 provided with the spindle 12. This machining liquid supply device 18, as described with reference to the foregoing embodiments, has an opening end of the machining liquid supply nozzle 20, and is connected by piping to a machining liquid source such as a machining liquid tank and.the like, not shown in FIGS. 6 and 7. The machining liquid supply nozzle 20 is arranged in such a manner that when the workpiece W is ground by the grinding wheel T, the chips produced in a machining area are rapidly flushed away by spouting the machining liquid through the opening end at the forward end of the nozzle 20 to the contact area P where the grinding wheel T and the workpiece T engage with each other to machine the workpiece W, while at the same time cooling both the grinding wheel T and the workpiece W to ensure proper and smooth machining.

What is claimed is:

1. A machine tool system for machining a workpiece by moving a tool mounted on a spindle and the workpiece mounted on a table included in the machine tool system relative to each other in three directions along an X-axis, a Y-axis and Z-axis, said machine tool system comprising:
   a spindle head for rotatably supporting the spindle;
   a column for movably supporting the spindle head;
   a tool mounting means for detachably mounting the tool on the spindle;
   a machining liquid supply means including a machining liquid nozzle for spouting a machining liquid toward a machining area where the tool engages with the workpiece, and connected by piping to a machining liquid source;
   a cylindrical supporting means disposed in an area surrounding the circumference of the spindle for movably supporting the machining liquid nozzle of the machining liquid supply means;
   a radial moving means for positioning, in a radial direction of the tool, the machining liquid nozzle of the machining liquid supply means supported on the cylindrical supporting means, by linearly moving or turning the machining liquid nozzle with respect to the tool; and
   a circumferential moving means for positioning the machining liquid nozzle of the machining liquid supply means over the entire circumference of the tool by rotating the cylindrical supporting means.

2. The machine tool system according to claim 1, wherein the radial moving means comprises a rack located on the machining liquid nozzle of the machining liquid supply means, a pinion movable relative to the cylindrical supporting means and in mesh with the rack, a worm wheel movable relative to the cylindrical supporting means together with the pinion, a worm in mesh with the worm wheel, and a linear movement motor fixed on the column for driving to rotate the worm.

3. The machine tool system according to claim 1, wherein the radial moving means comprises a pinion located on the machining liquid nozzle of the machining liquid supply means, a worm wheel having a pinion in mesh with the pinion and being movable relative to the cylindrical supporting means, a worm in mesh with the worm wheel, and a turning movement motor fixed on the column for driving to rotate the worm.

4. The machine tool system according to claim 1, wherein the circumferential moving means comprises a worm wheel integrated with the cylindrical supporting means, a worm in mesh with the worm wheel, and a rotating movement motor fixed on the column for driving to rotate the worm.

5. The machine tool system according to claim 1, further comprising a rotary table having at least one rotational feed shaft and a work rotating means for rotationally feeding the workpiece mounted on the rotary table.

6. The machine tool system according to claim 1, wherein the tool mounted on the spindle comprises a grinding wheel.

7. The machine tool system according to claim 6, further comprising a tool measuring means located in a part of a structure of the machine tool system for measuring a diameter or a tip position of the grinding wheel mounted on the spindle.

8. The machine tool system according to claim 6, further comprising a tool reconditioning means located on the column for truing or dressing an outer peripheral portion of the grinding wheel mounted on the spindle.

9. A machining liquid supply device of a machine tool system for supplying a machining liquid to a machining area where a tool mounted on a spindle engages with a workpiece mounted on a table included in the machine tool system, said machining liquid supply device comprising:
   a machining liquid supply means including a machining liquid nozzle for spouting the machining liquid toward the machining area and connected by piping to a machining liquid source;
   a cylindrical supporting means disposed in an area surrounding the circumference of the spindle for movably supporting the machining liquid nozzle of the machining liquid supply means;
   a radial moving means for positioning, in a radial direction of the tool, the machining liquid nozzle of the machining liquid supply means supported on the cylindrical supporting means, by linearly moving or turning the machining liquid nozzle with respect to the tool; and
   a circumferential moving means for positioning the machining liquid nozzle of the machining liquid supply means over the entire circumference of the tool by rotating the cylindrical supporting means.

10. The machining liquid supply device of a machine tool system according to claim 9, wherein the radial moving means comprises a rack located on the machining liquid nozzle of the machining liquid supply means, a pinion movable relative to the cylindrical supporting means and in mesh with the rack, a worm wheel movable relative to the cylindrical supporting means together with the pinion, a worm in mesh with the worm wheel, and a linear movement motor fixed on a part of structure of the machine tool system for driving to rotate the worm.

11. The machining liquid supply device of a machine tool system according to claim 9, wherein the radial moving means comprises a pinion located on the machining liquid nozzle of the machining liquid supply means, a worm wheel having a pinion in mesh with the pinion and being movable relative to the cylindrical supporting means, a worm in mesh with the worm wheel, and a turning movement motor fixed on a part of a structure of the machine tool system for driving to rotate the worm.

12. The machining liquid supply device of a machine tool system according to claim 9, wherein the circumferential moving means comprises a worm wheel integrated with the cylindrical supporting means, a worm in mesh with the worm wheel, and a rotating movement motor fixed on a part of a structure of the machine tool system for driving to rotate the worm.

* * * * *